UNITED STATES PATENT OFFICE 2,719,867

PURIFICATION OF PENTAERYTHRITOL

David X. Klein, Upper Montclair, and William R. Cake, Glen Rock, N. J., assignors to Heyden Chemical Corporation, New York, N. Y., a corporation of Delaware No Drawing. Application August 8, 1952,
Serial No. 303,402

7 Claims. (Cl. 260—637)

This invention relates to the preparation of pentaerythritol. More specifically, this invention relates to an improved process whereby pentaerythritol may be separated in a relatively pure and crystalline form from a reaction mixture produced by processes involving the condensation of acetaldehyde and formaldehyde in the presence of an alkaline catalyst.

A conventional process for the preparation of pentaerythritol involves the condensation of from 4 to 5 moles of formaldehyde with 1 mole of acetaldehyde, the reaction being carried out in an aqueous solution maintained alkaline by the presence of an alkaline material. From the standpoint of the mechanism of the reaction, it is generally believed that 1 mole of acetaldehyde reacts first with 3 moles of formaldehyde to produce pentaerythrose, which compound then reacts with another mole of formaldehyde and an alkaline material, for example, sodium hydroxide or calcium hydroxide, to produce pentaerythritol. This two-stage process is represented by the following equations:

(1) $CH_3CHO + 3CH_2O \rightarrow C(CH_2OH)_3CHO$
(2) $C(CH_2OH)_3CHO + CH_2O + NaOH \rightarrow$
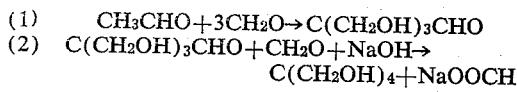
$C(CH_2OH)_4 + NaOOCH$ It should be mentioned that in the first stage, the alkaline material serves merely as a reaction catalyst, whereas in the final stage it reacts stoichiometrically. While sodium hydroxide is indicated as the alkali, other alkalis are, of course, utilizable and have previously been utilized in this reaction. Thus, the hydroxides and carbonates of the alkali metals, and the oxides and hydroxides of the alkaline earth metals, may be utilized as the reaction catalyst, while the use of strong alkalis is preferred in the second stage. Although these reactions actually occur in two distinct stages, ordinarily the complete process is carried out in a single step, the alkali agent initially introduced serving both as catalyst in the first stage and as reactant in the second.

Simultaneously with the above indicated reactions, side reactions occur and the final reaction mixture therefore contains a variety of products including pentaerythritol, polypentaerythritols (that is, the higher ethers of pentaerythritol such as dipentaerythritol, tripentaerythritol, etc), water soluble, syrupy, polyhydroxy condensation products, formates, etc.

In view of the fact that the reaction is carried out in an aqueous alkaline solution in which the alkalinity is usually supplied either by sodium hydroxide or calcium hydroxide, the commercially favored condensation catalyst for this manufacturing process, the formic acid liberated combines to form the corresponding formate of the alkali or alkaline earth metal present. Particularly when calcium hydroxide or oxide has been used as the alkaline material so that calcium formate is formed, it has often been the practice to add, for example, sulfuric acid and oxalic acid followed by filtration to remove the calcium ion. In this case the reaction liquor contains formic acid.

Considerable difficulty has been experienced in obtaining maximum yields of pentaerythritol due in part to the exacting conditions under which the reaction must be conducted and in part, to the formation of by-products during the recovery of the pentaerythritol from the reaction mixture.

Several processes have been developed for the recovery of pentaerythritol from the reaction liquors of the above described condensation reaction. For example, in a typical process, the pentaerythritol liquor is concentrated to a relatively high solids content and thereafter extracted with solvents such as for example, ethanol, in which the pentaerythritol is soluble. Pentaerythritol is then recovered from the alcoholic solution by fractional crystallization. This process, however, is not highly satisfactory in that the pentaerythritol thus obtained is contaminated with, for example, a relatively large amount of metal formates and hence is entirely unsuitable for many purposes such as the manufacture of high grade synthetic resins. In fact, the metal formate content of pentaerythritol obtained in this manner is usually so high that it is impractical to try to up-grade or improve the product, for example, by treatment with a cation exchange agent to reduce the metal ion content.

Likewise, in crystallizing and separating the pentaerythritol from the reaction mixture, the crystals that are obtained are generally contaminated with various impurities which tend to give the crystals an undesirable color. It is believed that the side reactions occasion the formation of strongly colored yellow to brown by-products which cause not only a serious decrease in the yield of pentaerythritol, but also make the isolation of a color-free crystalline pentaerythritol product extremely difficult.

It has now been found that when the concentration of the pentaerythritol liquor prior to the crystallization of pentaerythritol is carried out in the presence of a non-ionic, non-foaming, water soluble detergent, the pentaerythritol crystals which are obtained on cooling are larger than those obtained by conventional procedures and can be washed free of contaminants with less water than is usually required. The decrease in the amount of wash water needed is extremely important as it minimizes the loss of the product during the washing steps. An additional advantage of the detergent treatment of the reaction liquor is that a substantially pure and colorless pentaerythritol product is obtained.

Thus, in accordance with the present invention, it has become possible to inhibit the formation of colored by-products and to obtain substantially high yields of a coarse crystalline color-free pentaerythritol product. These unexpected results are achieved by the addition of the non-ionic detergent to the pentaerythritol liquor, thereby obviating any time-consuming or involved procedures which were heretofore necessary in order to obtain such a highly desirable product.

The term "non-ionic, non-foaming, water soluble detergent" is well known and understood. Such detergents are described in the book entitled "Synthetic Detergents" by John W. McCutcheon, 1950, MacNair-Dorland Company, New York. Particular reference is made to pages 23, 49–50, and 151–169, inclusive, of this book. The preferred type of detergents are the ethylene oxide condensates such as the condensates of fatty acids obtained from oils and fats, the condensates of rosin acids, the condensates of fatty and rosin acid mixtures such as tall oil, the condensates of fatty acids from the oxidation of the condensates of petroleum and the condensates of alcohols, said fatty acids or alcohols containing from 12 to 24 carbon atoms. Specific examples of such detergents include polyoxyethylene esters of fatty acids ("Energtic," manufactured by Armour & Co.), fatty and rosin acids condensed with ethylene oxides ("Ethofat," manufactured by Armour & Co.), tall oil ethylene oxide condensation products ("G–1226" manufactured by Atlas Powder Co.), dodecyl alcohol condensed with ethylene oxide ("Leonil C," a German product), ethylene oxide fatty alcohol condensates ("Aeto," a German product), ethylene oxide condensates ("Michelene," manufactured by Michel & Co.), polyethylene glycol tertdodecyl thioethers ("Nonic-218," manufactured by Sharples Chemicals, Inc.), ethylene oxide condensates of a fatty nucleus ("Nopalcol 10–DL," manufactured by Nopco Co.), ethylene oxide condensation products with dodecyl alcohol ("Peregal C," a German product), polyoxyethylene esters of mixed fatty and rosin acids [tall oil] ("Renex 48, 28," manufactured by Atlas Powder Co.), polyoxyethylene ethers ("Sterox CD, SE, SK," manufactured by Monsanto Chemical Co.), polyoxyethylene derivatives ("Sulfanole NF," manufactured by Warwick Chemical Co.), polyoxyethylene esters of fatty acids ("Triumph," manufactured by Armour & Co.), etc.

It is not necessary to condense the ethylene oxide before esterification. Frequently, it was an advantage to esterify and condense simultaneously in an autoclave, taking care to see that the ethylene oxide reacts as it is added since an accumulation of the oxide may result in a reaction of explosive violence. Condensing and esterifying in one step results in economy of operations.

Excellent results are obtained by the addition to a pentaerythritol liquor of amounts of a non-ionic, non-foaming, water soluble detergent in amounts varying between 0.05–0.2% based on the weight of the pentaerythritol liquor. Other amounts, and particularly larger amounts, may be used. The optimum amount of detergent depends, at least in part, on the particular detergent used.

Additional advantages and features of this new and highly improved process are set forth in the following example which discloses the principles of the invention and the improved embodiments of applying these principles. It is understood, however, that this example is merely illustrative and not limitative in nature, being capable of various modifications.

*Example*

To 4,000 parts of liquor obtained by the reaction of 4.6 mols of 20% formaldehyde, 1.2 mols of 32% sodium hydroxide, and 1 mol of 100% acetaldehyde, was added various quantities of different water soluble, non-ionic, non-foaming detergents. The liquor was concentrated to a specific gravity of 1.29 at 50° C. and then held at a temperature of 25° C. for sixteen hours. The pentaerythritol crystallizing from the liquor was isolated, washed with water, and then dried. The following results were obtained:

liquor or other aqueous mixture containing pentaerythritol, formic acid or its salts and the syrupy, polyhydroxy condensation products formed during the condensation of formaldehyde and acetaldehyde in an aqueous medium containing an alkaline material catalyst.

We claim:

1. In the process of separating pentaerythritol from an aqueous liquor containing pentaerythritol and syrupy polyhydroxy condensation products formed during the condensation of formaldehyde and acetaldehyde in the presence of an alkaline catalyst, the improvement which comprises adding to such a liquor from 0.05% to 0.2% by weight of a non-ionic, non-foaming, water-soluble detergent consisting of an ethylene oxide condensate of at least one substance selected from the group consisting of fatty acids, rosin acids, fatty alcohols and mixtures thereof, said acids and fatty alcohols containing from 12–24 carbon atoms and then precipitating and separating pentaerythritol crystals from the liquor.

2. The process claimed in claim 1 in which the detergent consists of ethylene oxide esters of mixed fatty acids and rosin acids.

3. The process claimed in claim 1 in which the detergent includes polyoxyethylene oxide esters of stearic acid and rosin acids.

4. The process claimed in claim 1 in which the detergent includes polyoxyethylene esters of linoleic acid and rosin acid.

5. The process claimed in claim 1 in which the detergent comprises polyethylene glycol tertdodecyl thioethers.

6. The process claimed in claim 1 in which the detergent comprises polyethylene ethers.

7. In the process of separating pentaerythritol from an aqueous liquor containing pentaerythritol and syrupy polyhydroxy condensation products formed during the condensation of formaldehyde and acetaldehyde in the presence of an alkaline catalyst, the improvement which comprises adding to such a liquor from 0.1% to 0.2% by weight of a non-ionic, non-foaming, water-soluble detergent consisting of an ethylene oxide condensate of at least one substance selected from the group consisting of fatty acids, rosin acids, fatty alcohols and mixtures thereof, said acids and fatty alcohols containing from 12–24 carbon atoms and then precipitating and separating pentaerythritol crystals from the liquor.

| Examples | Detergent Used | Amount, Percent | Amount of Wash Water Used (grams water per gram Pentaerythritol) | Weight of Isolated Pentaerythritol, g. | Percent Sodium Formate | Color | |
|---|---|---|---|---|---|---|---|
| | | | | | | APHA [1] | Gardner [2] |
| 1 | None | | 2.1 | 80.1 | 0.35 | 60 | 7.5–10.5 |
| 2 | polyoxyethylene esters of mixed fatty acids and rosin acids (Renex). | 0.2 | 1.15 | 84.1 | 0.07 | 21 | 3.5–6.5 |
| 3 | ___do___ | 0.05 | 1.0 | 85.2 | 0.06 | 16 | 4.0–8.0 |
| 4 | mixture of polyoxyethylene esters of stearic acid and rosin acids. | 0.1 | 1.15 | 84.7 | 0.10 | 11 | 4.0–6.5 |
| 5 | ___do___ | 0.2 | 1.20 | 85.3 | 0.13 | 17 | 3.5–6.5 |
| 6 | mixture of polyoxyethylene esters of linoleic acid and rosin acids. | 0.1 | 1.3 | 86.1 | 0.13 | 15 | 4.5–8.0 |
| 7 | ___do___ | 0.2 | 1.1 | 85.4 | 0.10 | 17 | 5.0–7.5 |

[1] The APHA color is the color of a 5% aqueous solution of the material as compared to standards established by the American Public Health Association—"Standard Methods of Water Analysis."
[2] The Gardner color indicates the change in color that the molten material undergoes when it is held at a temperature of 250° C. for 30 minutes. The standards were established by the Henry A. Gardner Co. in 1933.

The detergent increases the yield of pentaerythritol, reduces the quantity of wash water required and whiter crystals are obtained.

It is apparent from the foregoing that the invention is capable of various modifications and that, for example, the crude pentaerythritol liquor may contain either formic acid or formates and the liquor may be the reaction References Cited in the file of this patent

UNITED STATES PATENTS

| 2,292,926 | Brubaker | Aug. 11, 1942 |
| 2,534,191 | Cryer et al. | Dec. 12, 1950 |
| 2,629,746 | Cox | Feb. 24, 1953 |